HENRY W. BOWEN.
Improvement in Automatic-Cultivators.

No. 127,453.

Patented June 4, 1872.

2 Sheets--Sheet 1.

Witnesses.
S. N. Piper.
L. N. Miller

Henry W. Bowen.
by his attorney.
R. H. Eddy

2 Sheets—Sheet 2.
HENRY W. BOWEN.
Improvement in Automatic-Cultivators.
No. 127,453.  Patented June 4, 1872.
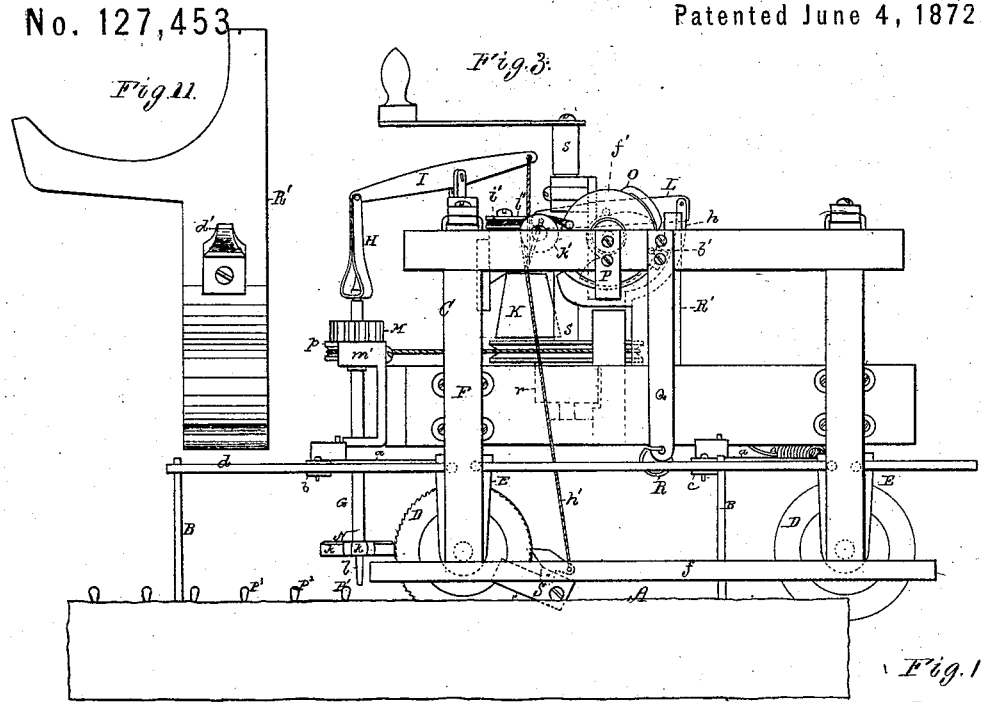
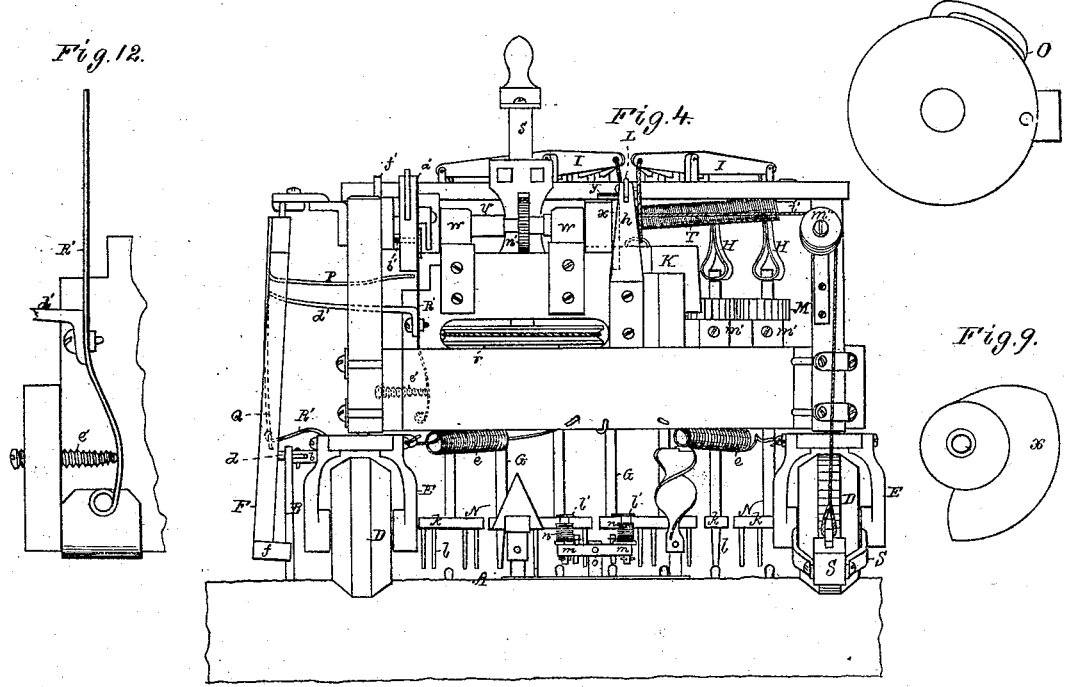
Witnesses.
S. N. Piper.
L. N. Möller.
Henry W. Bowen.
by his attorney.
R. H. Eddy

UNITED STATES PATENT OFFICE.

HENRY W. BOWEN, OF PROVIDENCE, RHODE ISLAND.

IMPROVEMENT IN CULTIVATORS.

Specification forming part of Letters Patent No. 127,453, dated June 4, 1872; antedated May 29, 1872.

*To all persons to whom these presents may come:*

Be it known that I, HENRY W. BOWEN, of the city and county of Providence, and State of Rhode Island, have invented a new and useful or Improved Automatic Cultivator; and do hereby declare the same to be fully described in the following specification and represented in the accompanying drawing, of which—

Figure 1:
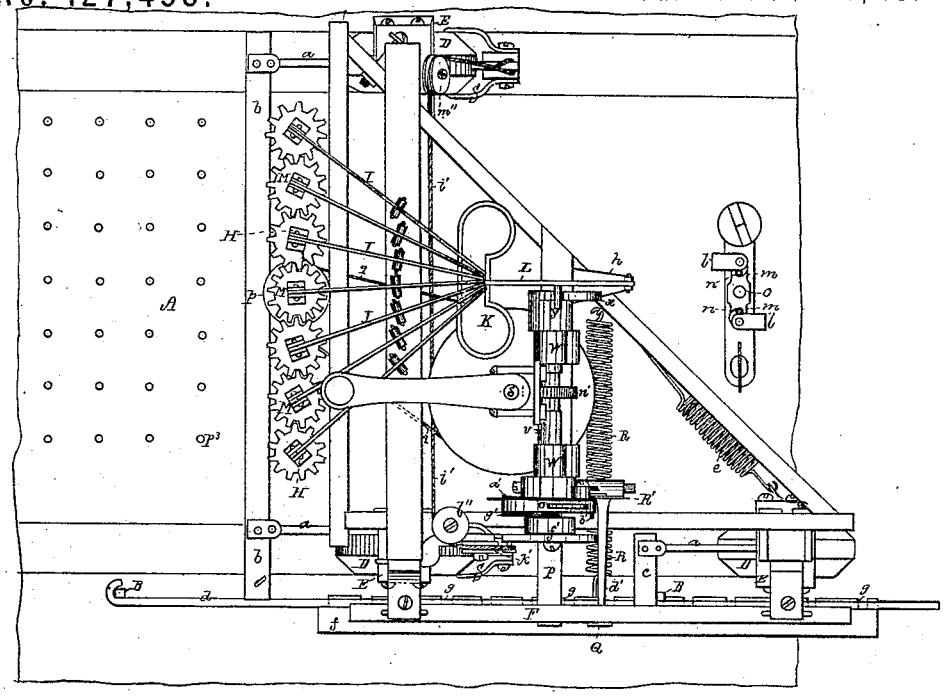
Figure 2:
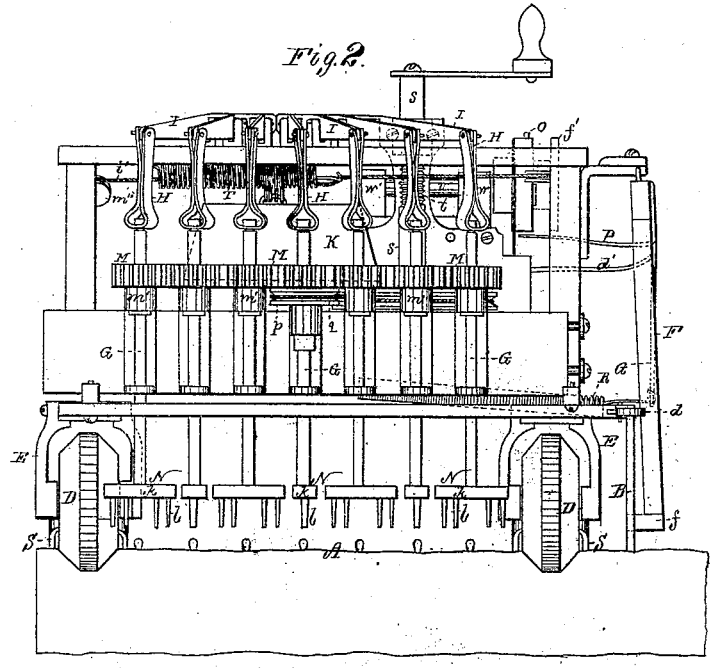

Figure 1 denotes a top view, Fig. 2 a front elevation, and Fig. 3 a side view, and Fig. 4 a rear elevation of such machine as applied to a field of plants.

Figure 6:
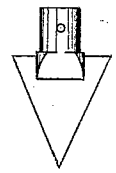
Figure 5:
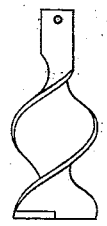
Figure 7:
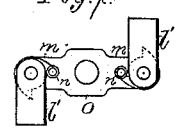
Figure 8:
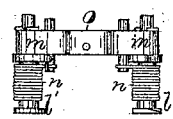

In the said drawing the field is shown at A as provided with two posts, B B, elevated vertically from it. It is to be understood that to adapt my machine to moving and working over a field, the latter is to have a series of the posts B B arranged in it in line, and at equal distances apart, so that the locking-frame of the machine to operate with such posts may, in passing from one of them, take upon that next to it during the progress of the machine over the field. The advance movement of the machine is to be intermittent, it moving from row to row of the plants and stopping at each row a sufficient period to perform the necessary work to be done on each of the plants of such row as may come within the sphere of its action. The frame of the machine is shown at C as mounted on three casters or caster-wheels D D D, arranged as shown. From the pivot-frames E E E of these wheels arms $a$ $a$ $a$ are projected, and pivoted at their outer ends to two bars, $b$ $c$, which in turn are hinged to one long guide-bar, $d$, resting against the two posts B B. Springs $e$ $e$, connected to the frame C and two of the caster-wheel frames, serve to cause the wheels to be turned in a manner to keep the guide-bar $d$ in close contact with the posts. There is suspended from the frame C a locking-frame, F, whose lower bar $f$ is provided with a series of notches, $g$, arranged in it in its inner edge, such notches being arranged at equal distances apart, and each being of a size to receive one of the posts B or lock thereon. On the front of the frame C is a series of vertical shafts, G, which, by means of hangers H, are suspended from a series of levers, I, arranged and fulcrumed on the top of the frame C, as represented. From the rear ends of their shafts a weight, K, is suspended, such weight being also hung to a lever, L, which at or near its rear end is fulcrumed or jointed to a stationary standard or arm, $h$, projecting upward from the frame C. The several shafts G go through a series of gears, M, arranged and made to engage with each other, as shown, there being one shaft to each gear, and they having a "feather-connection"—that is, such a connection as will allow of the shaft being slid up or down within the gear, and cause the gear while being revolved to revolve the shaft. A rake, N, or head $k$, provided with teeth $l$, arranged as shown, is fixed to the lower end of each of the shafts; but, instead of such a rake to each shaft there may be a tool, as shown in Fig. 5, which represents an auger, or in Fig. 6, which is a triangular countersink or borer, or in Figs. 7 and 8, one of which is an under-side view, and the other a side elevation of a rotary duplex hoe, the hoes $l$ $l'$ of which turn in the arms $m$ $m$, and are held to them by springs $n$ $n$ attached to the hoes and the head $o$, from which the arms $m$ $m$ extend horizontally. The gears M rest on brackets $m'$, which also serve to support and guide the shaft G, they being capable of sliding freely up or down in and revolving on the brackets. To one of the gears M a pulley, $p$, is fixed, there being an endless band, $q$, extended around such pulley, and a driving-pulley, $r$, fixed on the main driving-shaft $s$ of the machine, such shaft being arranged as represented. To this shaft the power or motor to actuate the machine is to be applied, whether such be a steam or other engine or an animal or animals. On the shaft $s$ is a worm or screw, $t$, which engages with a worm-gear, $u'$, fixed on a horizontal shaft, $v$, arranged as represented, and supported in boxes $w$ $w$ sustained by the frame C. There is fixed on one end of the shaft $v$ a cam, $x$, to operate against a stud, $y$, extending from the lever L, hereinbefore mentioned, such cam being shaped as shown in side view of it in Fig. 9.

While the said cam is being revolved it will elevate the lever L so as to cause it to raise the weight K, and thereby allow the shafts G to simultaneously descend so as to carry the tools in contact with and into the ground. The cam, continuing to further revolve, allows the weight to descend and effect, through the levers I, the raising of the shafts so as to elevate the tools out of the earth. Preparatory to each advance of the machine from one row of plants to another, or the sites therefor, the locking-frame F is to be swung out of engagement with one of the posts B. This is effected partly by a cam, O, fixed on the shaft $v$, a side view of such cam being represented in Fig. 10. While the said cam O is being revolved it meets and forces downward, and holds down for a while, an arm, P, extended rigidly from the locking-frame F. Another arm, Q, extended down from the frame F, in manner as shown, is fastened at its lower end to a spring, R, extended from the frame C, as shown, such spring being for the purpose of moving the locking-frame back or into engagement with one of the posts, which is accomplished when the machine has been advanced to a succeeding row of plants.

The machinery for effecting such advance may be thus explained. There is fixed to the inner side of the cam O a spring, $a'$, carrying at or near its free end a pin or stud, $b'$, that slides transversely through the cam. Furthermore, a forked spring, R', formed as shown in side view in Fig. 11, and arranged with the cam, as shown in Figs. 1 and 4, is provided with an arm, $d'$, extended from it toward the arm Q of the frame F. Fig. 12 exhibits an edge or rear view of the fork and its connection with the frame C, and also the stop-screw or adjustable stud $e'$, against which the fork-shank bears when the frame F is out of engagement with a post, B. There revolves freely on the shaft $v$ a wheel, $f'$, from whose hub an arm, $g'$, is extended alongside of the cam O. The wheel $f'$, by means of lines $h'$ $i'$ going around guide-wheels $k'$ $l''$ $m''$, arranged as shown, is connected with two pawl-carriers, S S, applied to the front wheels, and provided with pawls to act against such wheels, which, at the middles of their peripheries, and extending around them, are ratchet-teeth to co-operate with the pawls. After the frame F may have been forced out of engagement with a post the stud $b'$ will be carried around against the arm $g'$, and while so in contact therewith will cause the wheel $f'$ to be revolved by or with the shaft $v$, in consequence of which the pawls will be raised and the caster-wheels will be partially revolved by them, so as to effect the necessary advance of the machine to the next row of plants, which having taken place the spring carrying the stud $b'$ will be met by the fork R', and will be forced back by it, (the spring being shaped to act as a cam to accomplish such,) so as to draw back the stud out of action on the arm $g'$. As soon as this may have taken place the pawls and their carriers will be free to drop down upon the wheels, they being assisted in doing so by a spring, T, arranged as shown, and connected at one end to one of the pawl-carrier lines, and at the other to the frame C. In the drawing the rows of plants are shown at $p^1$ $p^2$ $p^3$, &c. If we suppose these plants to stand at the same distances apart in each row from center to center as the shafts G are from center to center, the said shafts being supplied with either of the kinds of tools as represented, the machine, on being put in operation, will perform its work on each row in succession, and will move from one to the other of them at the proper times; it being, while at rest, locked to one or more of the posts, and, while in motion from row to row, unlocked from such post or posts.

I claim—

1. The automatic cultivator, substantially as shown and described, or, in other words, the combination of the locking-frame F and the guide-bar $d$, provided with operative mechanism in substance as explained, with the carriage C and its series of rotary tool-shafts G, having mechanism for operating them essentially as set forth; and 2. In combination therewith, I claim one or more posts, B, arranged in manner and for the purpose as shown and explained.

HENRY W. BOWEN.

Witnesses:
R. H. EDDY,
J. R. SNOW.